Sept. 16, 1952 F. E. COOK 2,610,857

PORTABLE PHONOGRAPH

Filed June 20, 1946 3 Sheets-Sheet 1

INVENTOR.
Frank E. Cook
BY C. D. Tuska
ATTORNEY

PORTABLE PHONOGRAPH

Filed June 20, 1946 3 Sheets-Sheet 2

INVENTOR.
Frank E. Cook
BY [signature]
ATTORNEY

Sept. 16, 1952 F. E. COOK 2,610,857

PORTABLE PHONOGRAPH

Filed June 20, 1946 3 Sheets-Sheet 3

INVENTOR.
Frank E. Cook
BY C. D. Tuska
ATTORNEY

Patented Sept. 16, 1952 2,610,857

UNITED STATES PATENT OFFICE 2,610,857

PORTABLE PHONOGRAPH

Frank E. Cook, Runnemeda, N. J., assignor to Radio Corporation of America, a corporation of Delaware Application June 20, 1946, Serial No. 678,037

3 Claims. (Cl. 274—2)

The present invention relates to record players, and more particularly to a portable phonograph.

Some of the objects of the present invention are: to provide a compact relatively light phonograph which can be conveniently carried from place to place: to provide a phonograph wherein the tone arm is movable from a recess in the phonograph case to playing position and while in the rest position in the recess the exposed surfaces thereof form respectively continuations of the walls and top of the case: to provide a novel acoustical cover for a portable phonograph: to provide a cover for a portable phonograph having combined therewith a tone arm, pick-up, sound chamber and sound outlet: to provide a complete, personal portable phonograph unit including all components to form a closed unit of relatively small dimensions: and to provide other improvements as will hereinafter appear.

Figure 1:
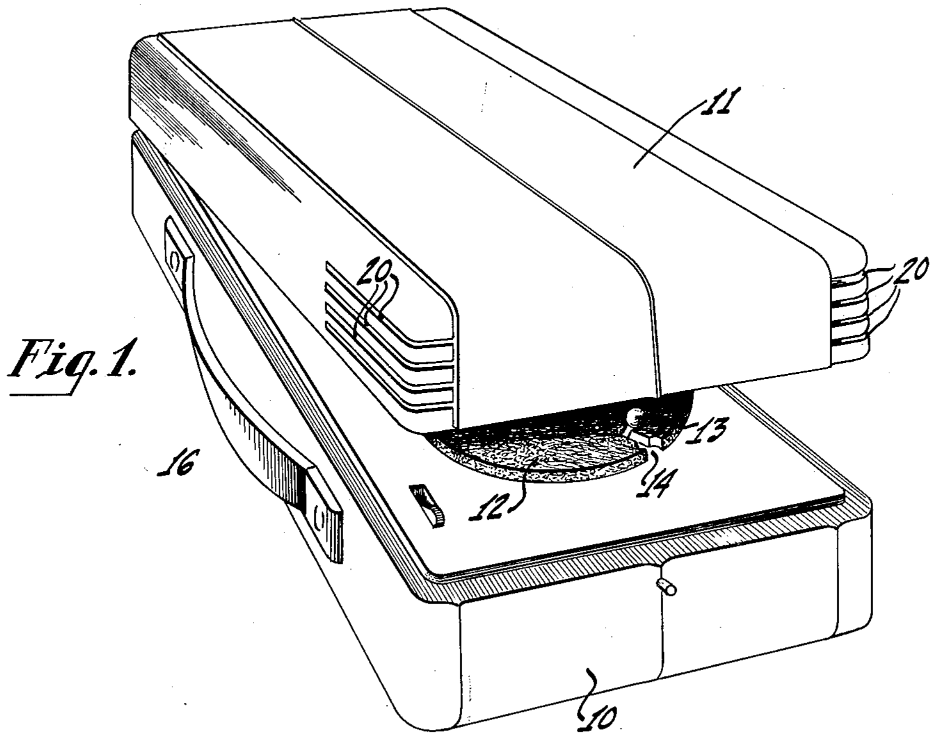
Figure 2:
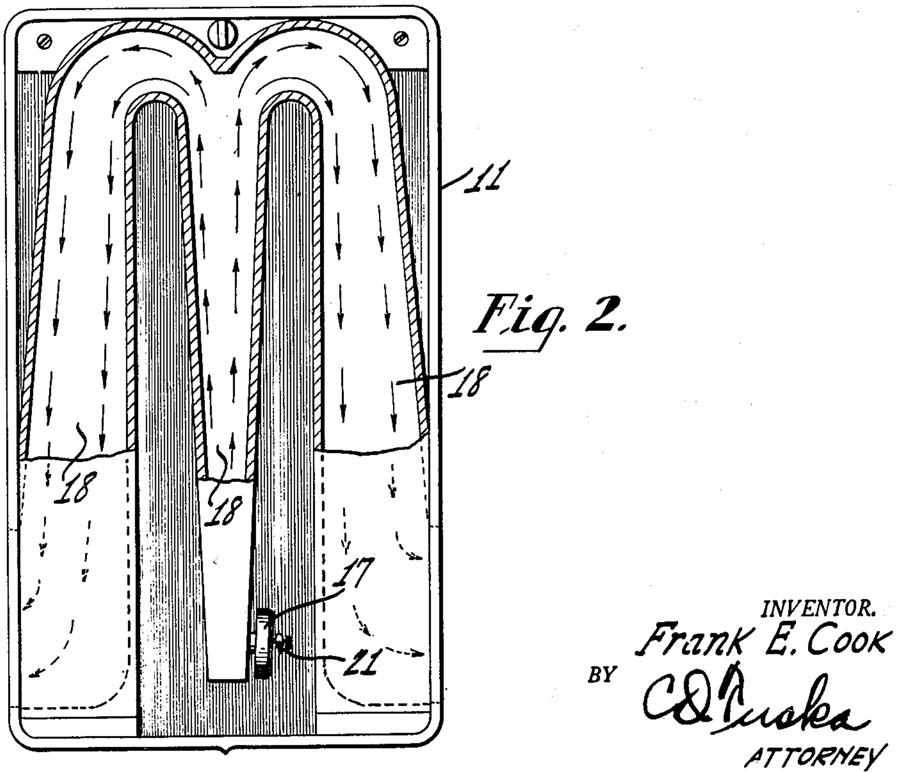
Figure 3:
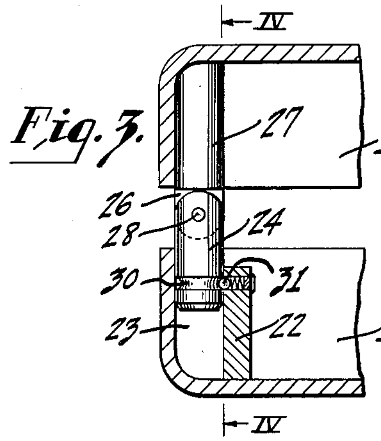
Figure 4:
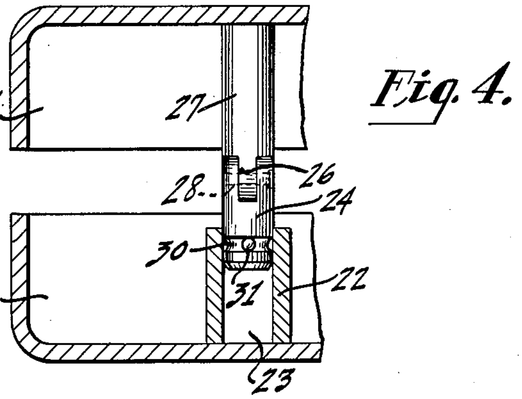
Figure 5:
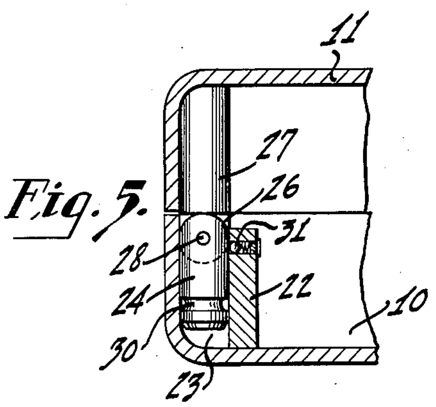
Figure 6:
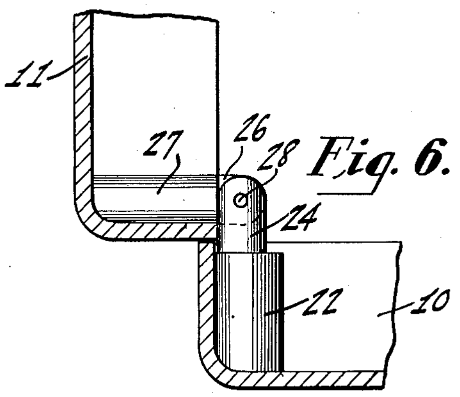
Figure 7:
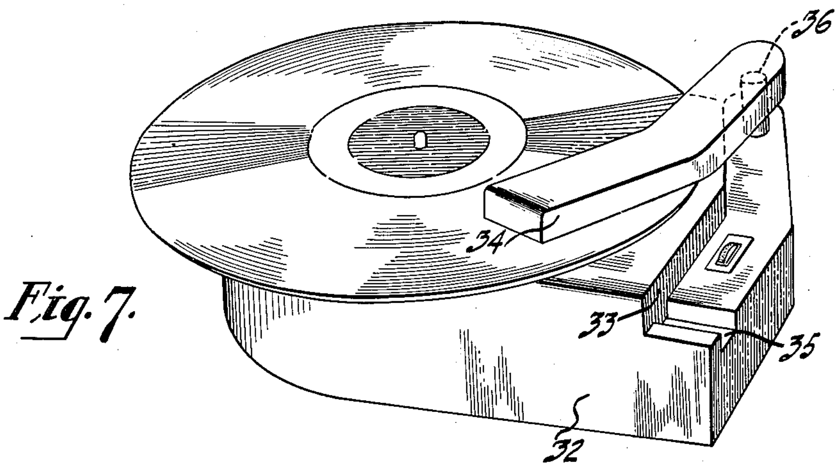
Figure 8:
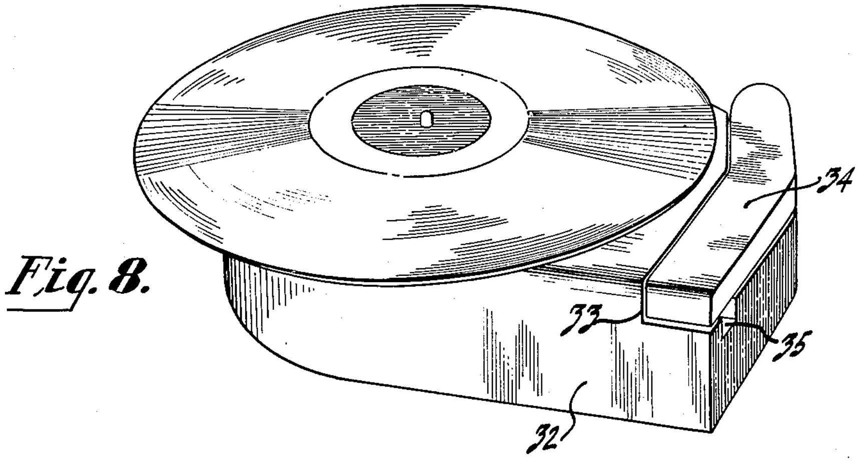

In the accompanying drawings Figure 1 represents a perspective of a portable phonograph unit embodying one form of the present invention: Figure 2 represents a bottom plan of the cover of the unit showing the tone arm chamber and pick-up: Figure 3 represents a fragmentary detail in section of the phonograph housing and cover in elevated or playing position showing the pivotal mounting as viewed from the side of the unit: Figure 4 represents a similar section showing the pivotal mounting as viewed from an end of the unit: Figure 5 represents a fragmentary detail in section of the housing with the cover in closed position showing the pivotal mounting as viewed from the side and in rest position of the tone arm: Figure 6 represents a similar section showing the cover in open position to give access to the turntable for record loading: Figure 7 represents a perspective of a modified form of the invention showing the tone arm in playing position: and Figure 8 represents the same showing the tone arm in rest position.

Referring to the drawings, one form of the present invention comprises a carrying case made as a box-like bottom section 10 and a cover section 11 hinged thereto. The bottom section 10 serves to house any suitable power means for rotating the turntable 12, and may be a spring motor (not shown) arranged to be wound manually by reversely turning the turntable 12 by means of a handle 13, pivotally attached to the turntable 12 in a recess 14 so that when not in use it lies depressed below the top plane of the turntable 12.

The cover section 11 is of inverted box shape so dimensioned as to seat over the bottom section 10 and form substantially side and end extensions respectively of the sides and ends of the bottom section 10 whereby a compact closed unit results which is readily transportable by means of a strap handle 16. Mounted within the cover section 11 is a sound box 17 in communication with a sound chamber 18 leading to sound outlet louvres 20, here shown as located at opposite sides respectively of the cover section 11. The usual needle 21 projects from the sound box 17 to engage a record on the turntable 12, as will be understood. Thus, the cover section 11 serves as both a cover and a tone arm.

In order to mount the cover section 11 on the bottom section 10 for opening, closing and lateral travel movements, the rear medial portion of the bottom section 10 may be molded, or otherwise provided with an open top housing 22 forming a cylindrical bore 23 to receive and journal a cylindrical stub shaft 24. The upper end of the shaft 24 is formed with a transverse slot arranged to receive a tongue 26 formed integral with a post 27 attached to and depending internally of the cover section 11. A pivot pin 28 interconnects the tongue 26 and the stub shaft 24, and in consequence the cover section 11 can swing on the vertical axis provided by the shaft 24, or on the horizontal axis provided by the pivot pin 28. In the former movement, the cover section 11 can travel freely across a record to permit the needle 17 to ride in and scan the sound groove or track in the record: and in the latter case, it can be lifted to clear the bottom section and fully expose the turntable 12 to load a record.

For the purpose of locking the cover section 11 in elevated position wherein it is spaced from the bottom section 10 along its entire length, the stub shaft 24 is provided with a circumferential groove 30 arranged, when the shaft 24 is elevated, to seat a spring pressed ball 31 suitably mounted in the housing 22 at the proper location to ensure the desired playing position of the combined cover and tone arm. Such position of the parts is shown in Figures 3 and 4.

In closed position of the cover, the parts are shown in Figure 5, while in full open position of the cover, the parts are shown as in Figure 6. In this latter position, the rear end wall of the cover section 11 has a portion thereof seating upon the rear wall of the bottom section 10 to give added stability.

In the form of the invention shown in Figures 7 and 8, the case 32 is provided with a recess 33 along one side having a contour complemental to the shape of the tone arm 34 and of a depth corresponding to the thickness of the tone arm. Thus, when the tone arm 34 is seated in the recess 33 its top face forms a continuation of the top face of the case, and its side wall forms a continuation of the side wall of the case. Thus, in rest position of the tone arm 34 the case is free of projecting parts and presents a pleasing unitary appearance. That portion of the recess 33 below the location of the pick-up needle is formed with a well 35 of such depth as to receive the needle and prevent damage thereto when the tone arm is lowered to rest position. A pivot post 36 is attached to the tone arm 34 and is arranged to slide vertically in the case to permit the elevating of the tone arm to playing position as well as allowing the required lateral swing when playing a record.

It will now be apparent that a complete, unitary, portable phonograph unit has been devised particularly for compactness and lightness for easy transportation. Preferably, the overall dimensions are approximately three and three-quarter inches in width, ten inches in length, and two and one-quarter inches in depth, such compactness being obtained by the novel construction of a cover serving as a tone arm with associated sound box. Furthermore, by the ingenious hinge structure full control of the cover section is obtained in all positions.

I claim as my invention:

1. A portable phonograph including top and bottom sections in the form of receptacles hinged together, the two sections being complemental in shape to form a closed housing, the bottom section of said housing containing a turntable and operating mechanism therefor, and the top section of said housing containing means forming an elongated sound chamber whereby said top section and means constitute a tone arm, a sound box adapted to carry a stylus mounted at one end of said chamber, the said hinge consisting of parts pivoted together to swing in two directions at right angles to each other and one of said parts consisting of a stub shaft slidably mounted in one of said sections, whereby the said top section may be bodily raised from the lower section and swung open for loading a record on the turntable and swung downwardly to permit the stylus to engage the record when placed on the turntable in record playing position.

2. The combination as defined in claim 1, in which the said top section is provided with at least one sound outlet communicating with said sound chamber.

3. The combination as defined in claim 1 in which means is provided to maintain the said top section in elevated position.

FRANK E. COOK.

REFERENCES CITED

The following references are of record in the file of this patent:

UNITED STATES PATENTS

| Number | Name | Date |
|---|---|---|
| 1,546,931 | Hinckley | July 21, 1925 |
| 1,610,129 | Goldberg | Dec. 7, 1926 |
| 1,683,160 | Buckle | Sept. 4, 1928 |
| 1,766,992 | Grass | June 24, 1930 |
| 2,246,130 | Forstron | June 17, 1941 |

FOREIGN PATENTS

| Number | Country | Date |
|---|---|---|
| 343,084 | Germany | Oct. 28, 1921 |
| 245,233 | Great Britain | Jan. 7, 1926 |